Patented Sept. 22, 1925.

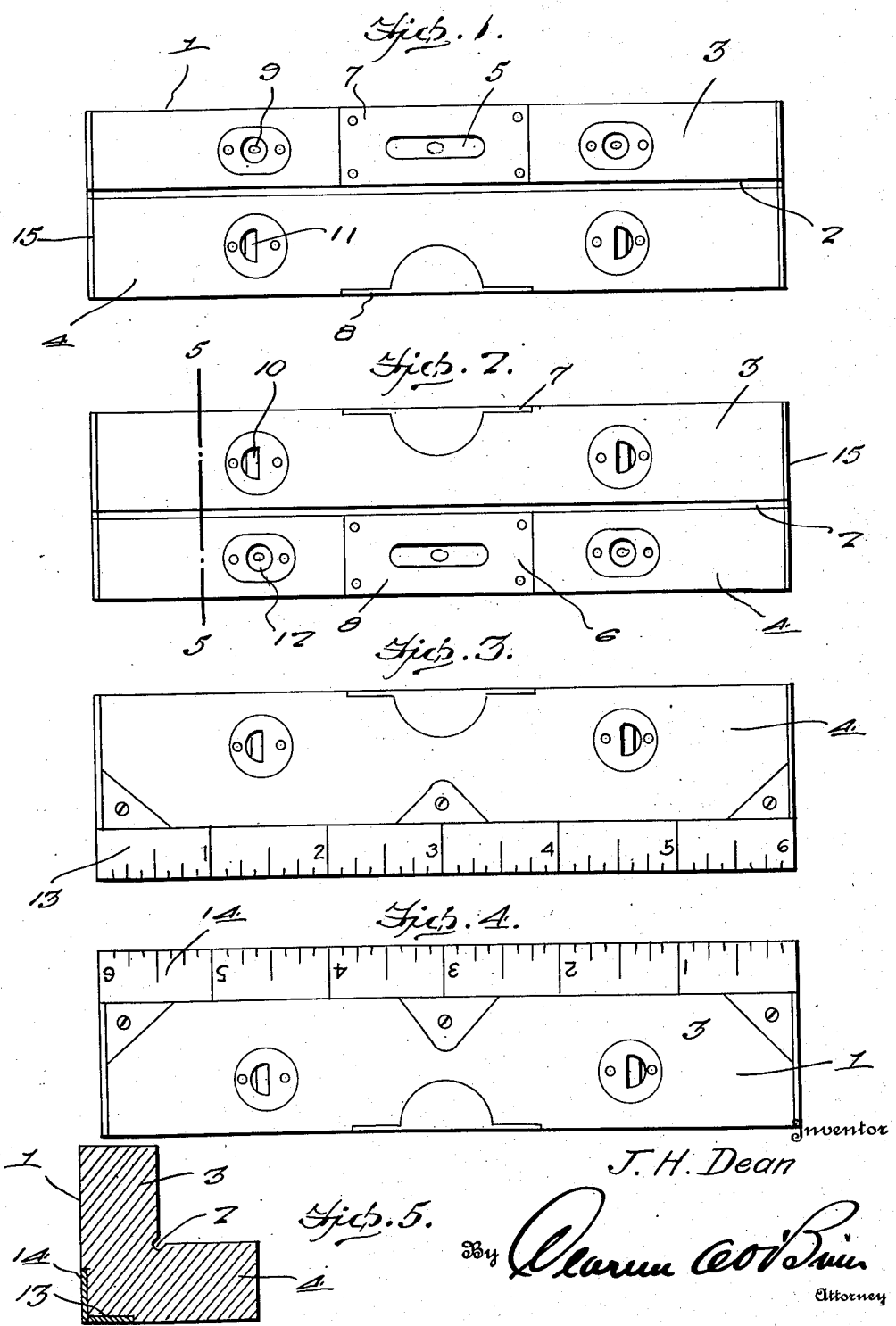

1,554,417

UNITED STATES PATENT OFFICE.

JOHN H. DEAN, OF MAHOMET, ILLINOIS.

COMPOUND SPIRIT LEVEL.

Application filed March 13, 1924. Serial No. 699,003.

To all whom it may concern:

Be it known that I, JOHN H. DEAN, a citizen of the United States, residing at Mahomet, in the county of Champaign and State of Illinois, have invented certain new and useful Improvements in Compound Spirit Levels, of which the following is a specification.

This invention relates to new and useful improvements in spirit levels and has for its principal object to provide a device which is of such construction as to enable a person to ascertain the planes of two adjacent sides of any object having angularly disposed surfaces and is preferably used in conjunction with masonry.

One of the important objects of the invention is to provide a twin level wherein considerable time and labor is saved in ascertaining the planes of two adjacent surfaces and which will positively indicate the positions of the objects upon which the level is used.

A still further object of the invention is to provide a twin level of the above mentioned character, which also includes level glasses arranged in such a manner as to permit the level to be placed edgewise so that the level of any object upon which the same is placed may be ascertained from various positions.

A further object of the invention is to provide a twin level of the above mentioned character, which also includes the provision of a measuring instrument in the form of a ruler thereon thereby enabling the level to be used for a number of various purposes.

A still further object of the invention is to provide a level of the above mentioned character, which is simple in construction, inexpensive, strong and durable, and further, well adapted for the purposes for which it is designated.

Other objects and advantages of this invention will become apparent during the course of the following description.

In the accompanying drawing forming a part of this specification, and in which like numerals designate like parts throughout the same, Figure 1 represents a front elevation of my improved level, Figure 2 is a side elevation thereof, Figure 3 is a rear end elevation, Figure 4 is a rear side elevation, and Figure 5 is a transverse section taken on line 5—5 of Figure 2.

In the drawing, wherein for the purpose of illustration is shown the preferred embodiment of my invention, the numeral 1 designates an elongated stock or body of my level and the same is substantially right angular in cross section as is clearly shown in figure 5 of the drawing. The inner corner of the stock 1 is grooved as shown at 2 in the drawing for the purpose hereinafter to be more fully described. Mounted in the outer edges of each of the arms or angularly disposed portions 3 and 4 respectively of the right angular shaped stock 1, are level glasses 5 and 6. Each level glasses is substantially of the construction well known in the art, and it is not thought necessary to further go in detail relative to the same. It is sufficient to state that each level glass is secured in the outer faces of the arms of the stock by means of the plates 7 and 8, respectively. These levels are preferably arranged in the central portion of the stock 1 intermediate the ends thereof in a manner as clearly shown in Figures 1 and 2 of the drawing.

Also mounted in the top and front faces of each of the arms of the right angular stock 1 are the glasses 9 and 10, and 11 and 12, respectively, in the manner as clearly shown on the drawing. The last mentioned level glasses extend substantially transversely to the level glasses 5 and 6, respectively and are supported on the stock 1 in a similar manner to which the level glasses 5 and 6 are secured.

The corner of the stock is formed with a groove in which metal corner strips 13 and 14 are seated. These strips being arranged in abutting relation and being flush with the corresponding outer surface of the angular disposed portions of the stock. The strips are preferably equipped with graduations, so that they may be utilized as rulers.

In ascertaining the planes of masonry work, it heretofore has been necessary for the workman to first place the stock on one side of the structure to ascertain the plane thereof, and then place the level on the adjacent side to get the level of the last mentioned surface. With a device of my character, this loss of time is eliminated, and by providing a substantially right angular shaped box with levels in each of the arms thereof, the workman may readily ascertain the planes of each of the surfaces of the adjacent sides, the groove 2 preventing the stock from riding on the edge of the objects upon which the same is applied.

When it is desired to ascertain the horizontal planes, the stock is placed lengthwise on the object and either level glass 5 and 6 may be used so that the workman may readily see a position of the object upon which the stock is placed. The levels which extend at substantially right angles to the levels 5 and 6 are brought into operation when the stock is placed on its respective end and if desired, suitable plates of brass or the like, such as are shown at 15 in the drawing, may be secured to the outer edges or ends of the stock and conform to the shape thereof whereby the stock will have a true edge. Furthermore, by providing the strips 13 and 14 on the outer side faces of the arms of the stock, the same provide a means for measuring whenever it is found necessary to use a ruler. This obviates the necessity of having to employ additional tools which frequently become lost.

It will thus be seen from the foregoing description, that a twin level has been provided which is of such construction as to enable the same to be easily and readily placed in use and furthermore will accurately indicate the surfaces upon which the same is placed. A level of the above mentioned character may further be manufactured at a very low cost and will be easily handled by the workman.

While I have shown the preferred embodiment of my invention, it is to be understood that various changes in the size, shape and arrangement of parts may be resorted to without departing from the spirit of the invention and the scope of the appended claims.

Having thus described my invention, what I claim is:—

1. A level of the class described comprising an elongated stock embodying right angularly disposed portions, the external corner provided at the juncture of said portion being provided with longitudinal grooves, a pair of strips, there being a strip arranged in each groove and the adjacent portions of the strips abutting each other, said strips being flush with the corresponding surfaces of the portions with which they coact, substantially L-shaped end plates secured to the ends of the angularly disposed portions, a plurality of individual levels mounted upon predetermined surfaces of said portions.

2. A level of the class described comprising an elongated stock embodying right angularly disposed portions, the external corner provided at the juncture of said portion being provided with longitudinal grooves, a pair of corner strips, there being a strip arranged in each groove and the adjacent portions of the strips abutting each other, said strips being flush with the corresponding surfaces of the portions with which they coact, and a plurality of individual levels mounted upon predetermined surfaces of said portions.

In testimony whereof I affix my signature.

JOHN H. DEAN.